(No Model.)

G. R. CULLINGWORTH & C. W. POTTER.
INLET VALVE FOR AIR COMPRESSORS.

No. 287,007. Patented Oct. 23, 1883.

Witnesses:
Ed. L. Moran
Fred Hayner

Inventor:
George R. Cullingworth
Charles W. Potter
by their Attorneys

UNITED STATES PATENT OFFICE.

GEORGE R. CULLINGWORTH AND CHARLES W. POTTER, OF NEW YORK, N. Y., ASSIGNORS TO THE SERGEANT & CULLINGWORTH COMPANY, OF SAME PLACE.

INLET-VALVE FOR AIR-COMPRESSORS.

SPECIFICATION forming part of Letters Patent No. 287,007, dated October 23, 1883.

Application filed January 16, 1883. (No model.)

*To all whom it may concern:*

Be it known that we, GEORGE R. CULLINGWORTH and CHARLES W. POTTER, both citizens of the United States, and both residing in the city, county, and State of New York, have invented a new and useful Improvement in Inlet-Valves for Air-Compressors, of which the following is a specification.

Our invention relates to that class of inlet-valves for air-compressors which has a hollow cylindrical sleeve or stem connected to the valve-head by a skeleton bridge, as described and claimed in another application filed by George R. Cullingworth, of even date herewith; and the improvement consists in providing on the end of the sleeve opposite to the valve-head an outwardly-projecting integral flange for the upper support of the valve-spring, which dispenses with the separate bearing-nut described in the above-named application, and in having the valve-casing made in two parts, in order to provide for the insertion of the hollow flanged sleeve or stem.

Figure 1:
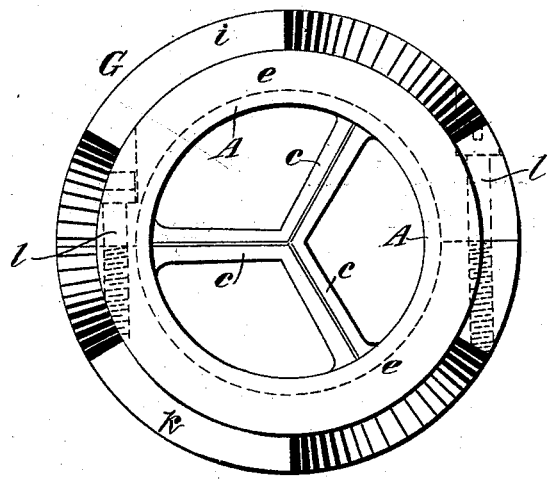
Figure 2:
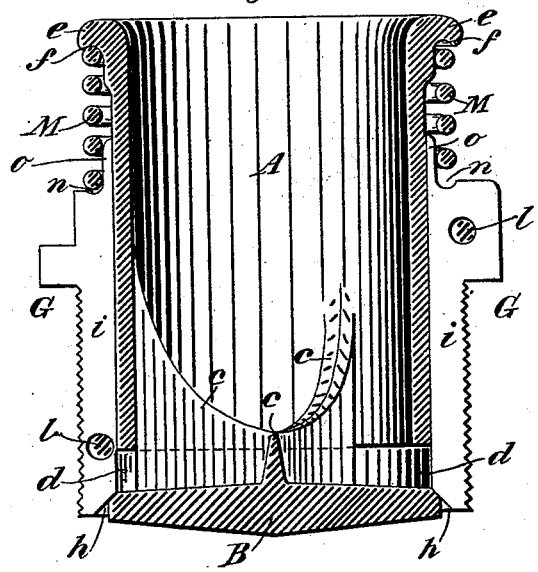

In the accompanying drawings, Figure 1 represents a plan of our improved inlet-valve. Fig. 2 represents a longitudinal section of the same with the valve closed.

A represents the hollow valve cylinder or sleeve, which is connected to the valve-head B by a bridge or skeleton support, $c\ c\ c$, leaving an annular air space or passage, $d$, between the sleeve and valve-head. On the upper end of the sleeve A is an outwardly-projecting flange, $e$, which is cast integral with said sleeve, and is provided upon its under side with an annular groove, $f$, for the upper support of the valve-spring.

The casing G, upon which is the valve-seat $h$, is made in two parts, $i$ and $k$, in order to provide for the insertion of the flanged valve-sleeve A. These parts are held together by screws $l$. The casing G is also provided with an external screw-thread for the purpose of securing it to the cylinder of an air-compressor.

M is the spring which encircles the sleeve A and serves to close the valve. The casing G is provided with an annular groove, $n$, similar to that upon the under side of the flange $e$. These grooves serve to support the spring M and keep it in place. The upwardly-projecting flange $o$ upon the casing G serves to keep the spring away from the wall of the sleeve A and to guide the spring into the groove $n$. The air entering the hollow valve-sleeve A from above will strike against the valve-head B, forcing it down, and with it the valve-sleeve. The air will then escape through the annular air-passage $d$, when, the pressure of the air being removed from the valve-head, the spring M will force the valve against the seat $h$, thus closing the valve again.

What we claim as our invention, and desire to secure by Letters Patent, is—

The combination of the valve composed of a hollow cylindrical stem and a head connected therewith by a skeleton bridge, which leaves an annular opening between said head and stem, and having at the end opposite to the head an integral flange of an axially-divided valve-casing, and a spiral spring placed around the said hollow cylindrical stem, between the said flange and the said casing, substantially as herein described.

G. R. CULLINGWORTH.
CHAS. W. POTTER.

Witnesses:
FREDK. HAYNES,
ED. L. MORAN.